United States Patent
Core et al.

(10) Patent No.: US 11,400,392 B2
(45) Date of Patent: Aug. 2, 2022

(54) FILTER ELEMENT

(71) Applicant: Parker Hannifin Manufacturing (UK) Ltd., Hemel Hempstead (GB)

(72) Inventors: Phillip Robert Core, Leeds (GB); Jonathan Robert Hughes, Huddersfield (GB)

(73) Assignee: Parker Hannifin Manufacturing (UK) Ltd., Hemel Hempstead (GB)

(*) Notice: Subject to any disclaimer, the term of this patent is extended or adjusted under 35 U.S.C. 154(b) by 193 days.

(21) Appl. No.: 16/505,872

(22) Filed: Jul. 9, 2019

(65) Prior Publication Data

US 2019/0329161 A1  Oct. 31, 2019

Related U.S. Application Data

(63) Continuation of application No. PCT/GB2018/050176, filed on Jan. 22, 2018.

(30) Foreign Application Priority Data

Jan. 23, 2017 (GB) ..................... 1701105

(51) Int. Cl.
  *B01D 29/11* (2006.01)
  *B01D 27/08* (2006.01)

(52) U.S. Cl.
  CPC ............ *B01D 29/117* (2013.01); *B01D 27/08* (2013.01); *B01D 2201/291* (2013.01);
  (Continued)

(58) Field of Classification Search
  CPC ...... B01D 29/117; B01D 29/11; B01D 29/00; B01D 29/96; B01D 27/08; B01D 27/14;
  (Continued)

(56) References Cited

U.S. PATENT DOCUMENTS 4,743,374 A  5/1988 Stifelman
4,834,885 A  5/1989 Misgen
(Continued)

FOREIGN PATENT DOCUMENTS

CA  2 236 517 C  11/2000
DE  10 2005 021957 A1  12/2005
(Continued)

OTHER PUBLICATIONS

DE 10 2005021957 A1 English description, Dec. 2005, Eberle Richard et al.*
(Continued)

*Primary Examiner* — Akash K Varma
(74) *Attorney, Agent, or Firm* — Christopher H. Hunter

(57) ABSTRACT

A filter element (2) is disclosed which comprises a filtration media (4) and an end fitting (6) through which a sealing connection is made between the filter element and a housing (100) so that, when the sealing connection is made, the end fitting defines in part a flow path for fluid between the housing and the filter element. The end fitting includes an annular seal (36') made from a compressible material which extends around the periphery of the filter element, and a support (30, 31, 32, 34) for the annular seal which can be expanded outwardly to cause the transverse dimension of the seal to increase so that the seal is urged into contact with an inner wall of a housing (100) in which the filter element is located.

24 Claims, 4 Drawing Sheets

(52) U.S. Cl.
CPC .. *B01D 2201/304* (2013.01); *B01D 2201/305* (2013.01); *B01D 2201/347* (2013.01); *B01D 2201/4076* (2013.01)

(58) Field of Classification Search
CPC .............. B01D 27/00; B01D 2201/291; B01D 2201/304; B01D 2201/305; B01D 2201/347; B01D 2201/4076; B01D 35/30; F01M 11/03; F02M 37/22; F16N 39/06
USPC ........................................................ 210/232
See application file for complete search history.

(56) References Cited

U.S. PATENT DOCUMENTS

| | | | |
|---|---|---|---|
| 5,300,223 | A | 4/1994 | Wright |
| 2002/0166810 | A1 | 11/2002 | LeBlanc |
| 2011/0296999 | A1 | 12/2011 | Foerster |
| 2012/0037557 | A1 | 2/2012 | Atteberry |
| 2015/0090651 | A1 | 4/2015 | Kotale |
| 2016/0144298 | A1 | 5/2016 | Jokschas |
| 2016/0279547 | A1* | 9/2016 | Jainek .................... F02M 37/42 |
| 2017/0014738 | A1* | 1/2017 | Malgorn ................ B01D 35/30 |

FOREIGN PATENT DOCUMENTS

| | | | | |
|---|---|---|---|---|
| DE | 10 2005021957 A1 | * | 12/2005 | .............. F01P 11/06 |
| DE | 20 2007 017614 U1 | | 4/2009 | |
| DE | 20 2013 011841 U1 | | 3/2015 | |
| EP | 2 231 302 A1 | | 9/2010 | |
| EP | 2 815 796 A1 | | 12/2014 | |
| FR | 3 018 203 A1 | | 9/2015 | |
| WO | 2012/143793 A1 | | 10/2012 | |
| WO | 2012/153430 A1 | | 11/2012 | |

OTHER PUBLICATIONS

Search Report for GB1701105.7 dated Jun. 26, 017.
International Search Report and Written Opinion for PCT/GB2018/050176 dated May 4, 2018.
Written Opinion for PCT/GB2018/050176 dated Jan. 24, 2019.
International Preliminary Report on Patentability for PCT/GB2018/050176 dated Jun. 4, 2019.

* cited by examiner

FILTER ELEMENT

This application is a continuation application pursuant to 35 U.S.C. § 120 of PCT/GB2018/050176 filed on Jan. 22, 2018 which claims the benefit of G.B. Application No. 1701105.7 filed Jan. 23, 2017, the disclosures of which are incorporated herein by reference.

FIELD OF THE INVENTION

This invention relates to a filter element and to a filter assembly which includes a filter element. The filter can be used to remove contaminants from a fluid, especially particulate contaminants. The fluid can be a liquid or a gas.

BACKGROUND

Filters which are used to remove contaminants from a fluid frequently include a filter element which is mounted in a housing. The filter element includes a filter media. The fluid flows through the filter media. The housing includes an inlet through which the fluid is supplied to the filter element, and an outlet through which the fluid can be discharged from the filter after it has been filtered by flowing through the filter media. The material of the filter media is selected according to the nature of the fluid, the nature of the contaminants, and the operating conditions of the filter.

It is common for the filter element to be capable of being removed from the housing for replacement, in particular when its capacity to absorb contaminants is limited. It is important for efficient operation of the filter that seals are created reliably between corresponding surfaces of the filter element and the housing to ensure that the fluid which is to be filtered is not able to flow between the inlet and outlet in the housing without having to flow through the filter media.

A compressible O-ring can be provided between the surface of a filter element and the surface of a housing (including a surface of a filter element which provides the surface of the housing) which faces the surface of the filter element so that, when the filter element is in its working position in the housing, the O-ring is compressed between the surfaces of the filter element and the housing. This can be achieved for example by providing the O-ring in a groove formed in the external surface of the filter element. The housing can have an opening for receiving the filter element. The opening can be flared so that its transverse dimension (which will be its diameter when the opening is circular) is greater than the transverse dimension of the wall of the housing at a point which is spaced from the opening. When the filter element is in its working position in the housing, the O-ring is located at a point which is spaced from the opening. Moving the filter element into its working position involves moving the O-ring from the opening to the point which is spaced from the opening. The O-ring is progressively compressed during this movement.

The requirement to compress the O-ring when a filter element is moved to its working within a housing might hinder complete insertion of the filter element into a housing. This might make it more difficult to complete the assembly of the filter, for example when connecting head and body parts of a filter housing. It is possible that, in some situations, an O-ring might be damaged when it is moved to its working position, with the consequent risk that a seal provided by the O-ring might be compromised.

SUMMARY

A filter element is provided in which an annular seal is provided on a support portion which can be expanded outwardly to cause the transverse dimension of the seal to increase so that the seal is urged into contact with the inner wall of a housing in which the filter element is located.

A filter element is therefore provided which comprises a filtration media and an end fitting through which a sealing connection is made between the filter element and a housing so that, when the sealing connection is made, the end fitting defines in part a flow path for fluid between the housing and the filter element, in which the end fitting includes:

a. an annular seal made from a compressible material which extends around the periphery of the filter element, and b. a support for the annular seal which can be expanded outwardly to cause the transverse dimension of the seal to increase so that the seal is urged into contact with the inner wall of a housing in which the filter element is located.

Such a filter element has the advantage that the seal can be deployed after the element has been located in its working position within a housing. The seal does not therefore impede complete insertion of the filter element into the housing. The steps of positioning the element in the housing and forming the seal are separated. This can provide more control of the formation of the seal between the filter element and the housing. The seal is also protected against damage due to contact with the housing while the filter element is moved into its working position in the housing as a result of being retracted relative to its configuration in which it is expanded outwardly by the support.

A further advantage of the filter element is that it is not necessary to provide a flare or chamfer on the opening into the filter housing. This can simplify manufacture of a housing.

The support can have at least one slit formed in it which facilitates outward expansion of the support. The support can have a plurality of slits formed in it, arranged around the periphery of the support, so that the support comprises a plurality of segments which can flex to allow the transverse dimension of the support to increase. For example, the support can have at least two slits or at least three slits or at least four slits or at least five slits or at least six slits. Optionally, slits are spaced apart approximately evenly around the support.

Optionally, the slits are arranged so that they extend approximately parallel to the axis of the element. Optionally the slits are arranged so that they extend approximately perpendicular to the direction in which force is applied to the support to cause it to expand outwardly into contact with the inner wall of a housing. Expansion of the support can involve bending of the segments which are defined by the slits.

The slits will frequently be narrow so that the interruption to the support for the annular seal is minimised. However, wider slits are contemplated for some applications.

The filter element can include a sealing web which covers the or each slit so as to prevent flow of fluid through the or each slit. A sealing web will generally be a continuous web. The sealing web can be made of a resilient material which is capable of being deformed. The deformation can be an elastic deformation. The material of the sealing web will be selected according to materials with which it will come into contact when the filter element is in use. For example, the support can have at least one slit formed in it which facilitates expansion of the support and in which the sealing web can be provided as a deformable collar formed from an elastomeric material which covers the or each slit in the support.

A sealing web can be provided as a part of the support. It can be formed from a material which is different from that of flexible support segments and fixed against movement relative to such segments, for example by friction forces or by means of an adhesive or as a result of being formed by a co-moulding process. A sealing web which is fixed against movement relative to flexible support segments has the advantage that the risk of a fluid flow path through one of the slits as a result of the slit being not fully covered by the sealing web is minimised.

It can be preferred that the material of a sealing web extends into at least partially into the or each slit between segments of the support. It can also be preferred that such sealing web material is fastened to the edge surfaces of the segments which are defined by the slit so that, as the segments move apart from one another when the support is expanded, the sealing web material within the slit is elongated. Sealing web material can be fastened to the edge surfaces of the segments as a result of a co-moulding process. They might be fastened to the edge surfaces by means of an adhesive.

The annular seal can be an O-ring. The O-ring can be provided as a component which can be separated from the support. The support can have a groove in its outer wall and the O-ring can be received in the groove. The groove will frequently also have a sealing web positioned in it when the support has one or more slits formed in it.

An annular seal in the form of an O-ring and a sealing web can be fitted on to and separated from the support as a single component. The annular seal and the sealing web can be formed integrally, for example by a moulding process. The annular seal and the sealing web can be formed as two parts which are then joined together by forming a bond between them. The bond can be made without the use of a material other than the material(s) of the seal and the web, for example by the application of heat to form a weld. The bond can be made using a material other than the material(s) of the seal and the web, for example using an adhesive.

The annular seal can be an O-ring which is formed as one piece with the support so that the O-ring and the support cannot readily be separated. The O-ring and the support can be formed by a moulding process, for example a process in which the O-ring and the support are formed from different materials by co-moulding, or by a process in which the O-ring (optionally with a sealing web) is over-moulded on to the support.

The support can have an opening within it and the filter element can be provided with an expander component which can be inserted into the opening and can then cause the support to expand outwardly. The expander component can be used to close the opening when inserted into the opening, for example as a lid or cap.

The expander component and the end fitting can include features which promote expansion of the support as the expander component and the end fitting are assembled together. For example, one of the expander component and the end fitting can have a ramp surface which is inclined to the axis on which the expander component and the end fitting are moved relative to one another during assembly, and which engages a surface on the other of the expander component and the end fitting. It can be convenient for the ramp surface to be provided on the expander component. For example, when the expander component is a lid or cap, it can have a protrusion which extends towards the end fitting as the expander component is advanced towards the end fitting, with an inclined ramp surface on the protrusion which engages a surface on the support, especially which engages individual support segments arranged around the periphery of the support.

The expander component can include features for retaining the expander component in the position in the support in which the support is expanded outwardly and the transverse dimension of the seal is increased. The features on the expander component can engage the end fitting, especially the support so that the expander component is retained in position. The features on the expander component can engage another part of the assembly, for example the wall of the housing in which the filter element is assembled. For example, the expander component can be provided by a closure cap which is fitted on to the housing to close the opening through which the filter element is introduced into the housing. A closure cap and a housing can be provided with mating threads or with bayonet closure features or other connection features.

The expander component and the end fitting can be fastened to one another by means of a separate fastener such as a threaded bolt.

It can be preferred to provide a latch for connecting the expander component to the end fitting. The latch can retain the expander component in the position in the support in which the support is expanded outwardly and the transverse dimension of the seal is increased. The latch can hold the expander component and the end fitting together so that, when the expander component is separated from a housing for replacement of the filter element, the filter element is separated from the housing with the expander component. This can facilitate removal of the filter element from within the housing without the filter element having to be gripped directly.

A latch can be provided by at least one tang which extends from one of the end fitting and the expander component to a recess on the other of the end fitting and the expander component. The tang has a lip towards its free end. The lip on the tang is received within the recess as the expander component and the fitting are pressed together. The extent to which the latch allows relative movement between the end fitting and the expander component depends on the length of the tang. The latch can retain the expander component in the position in the support in which the support is expanded outwardly and the transverse dimension of the seal is increased when the length of the tang is such that the lip is received in the recess just as the expander component reaches the position in which the support is adequately expanded. The latch can be used to hold the expander component and the end fitting together so that the filter element is separated from the housing with the expander component by use of a longer tang which allows the expander component to be displaced from its position in the support in which the support is expanded outwardly while the lip on the tang is still within the recess.

The O-ring will frequently be made of a resilient material which is capable of being deformed. The deformation can be an elastic deformation. The material of the O-ring will be selected according to materials with which it will come into contact when the filter element is in use.

The O-ring and the sealing web can be made from the same material.

Suitable materials for the O-ring or the sealing web or for each of the O-ring and the sealing web are known from existing filters. They can include certain rubbers, including for example acrylonitrile butadiene rubbers (NBRs), ethylene propylene diene monomer (EPDM) rubbers, silicone rubbers, fluorosilicone rubbers, and thermoplastic elastomers.

The filter element can include a cylindrical wall of a filter media which is arranged so that the fluid which is to be filtered flows through the wall between a first port which communicates with the valve in the housing and the central axial cavity within the filter element and a second port which communicates with the circumferential space around the outside of the element. The second port will frequently be at or adjacent to an end of the filter element. The second port can be at or adjacent to the same end of the filter element as the first port. The second port can be at or adjacent to the opposite end of the filter element from the first port.

The filter assembly can be designed to operate with the fluid to be filtered flowing through the wall of the filter element from the inside to the outside. The filter assembly can be designed to operate with the fluid to be filtered flowing through the wall of the filter element from the outside to the inside.

The material for the media in the filter element will be selected according to the fluid which is to be filtered and the nature of contaminants that are to be separated from the fluid. The fluid might be a gas or a liquid. The contaminants might be solid or liquid (especially when the fluid is a gas). Features of filter elements which can be incorporated in the element used in the assembly of the invention are known from existing filter elements for various applications.

The material of the filter media is selected according to the intended application for the filter. The filter might be used to filter a pressurised gas, such as for example compressed air. The filter might remove particulate contaminants from the gas including aerosol droplets. The filter might be used to filter a liquid. The filter can remove solid particles from the liquid. The filter can be used to separate an immiscible liquid contaminant from a process liquid, for example to remove water from a hydrocarbon fuel. Examples of materials for the filter media include open cell foam materials, paper or other cellulosic materials, materials made from non-woven fibres, such as for example melt blown fibres, which might be made from polymers such as polyesters and polyamides.

The end fitting can be an end cap of the filter element. The end fitting can include one or more axially facing grooves in which an axially facing edge of the filter media is received. The filter element might include a support layer for the filter media, for example in the form of a perforated plate. A perforated plate or other support can help to separate contaminants from a fluid stream. The support layer, and possibly other layer components, can also be received in the axially facing groove in the end fitting. An end fitting can include more than one axially facing groove. Component layers (filter media (including coalescer), supports etc.) of a filter element can be distributed between respective grooves. The edges of component layers can be fastened within the grooves provided in the end fittings by means of a material other than the materials of the component layers of the filter element and of the end fitting, for example by means of an adhesive material. The edges of component layers can be fastened within the grooves provided in the end fittings without use of a material other than the materials of the component layers and of the end fitting, for example by a welding technique in which the materials of one or both of the component layer(s) and the end fitting (especially the material of the end fitting) is made to melt. This might be achieved by exposure to infrared radiation. Appropriate fastening techniques are known for use in the construction of filter elements.

An end fitting can be formed from a polymeric material by moulding. Materials which can be used in this way in the manufacture of filter element end fittings are known. The selection of a suitable material will depend on the application for the filter element including for example the materials to which it will be exposed when in use and the conditions (for example temperature and differential pressure across the element). Filter media layer components can be fastened within an axially facing groove in an end fitting using an adhesive material, or by use of a welding technique.

Features presented in this document are applicable to a filter which has inner and outer coaxial filter elements. The filter element in which the end fitting includes an annular seal and a support for the seal can be the inner one of the coaxial filter elements, with the annular seal forming a seal between the inner and outer coaxial filter elements. The outer coaxial filter element then provides the inner wall of the housing which is engaged by the seal. Alternatively, or in addition, the filter element in which the end fitting includes an annular seal and a support for the seal can be the outer one of the coaxial filter elements, with the annular seal forming a seal between the outer coaxial filter element and an inner wall of the housing. The inner and outer filter elements might be removed from the housing together. The inner filter element might be removed from within the outer filter element while the outer filter element is in position within the housing.

A filter assembly is provided which comprises a filter element as discussed above, and a housing having a cavity in which the filter element can be received, the cavity having an inner wall which is contacted by the annular seal when its transverse dimension has been increased.

The housing can have an open end through which the filter element can be positioned in the cavity within the housing. The expander component can be a cap which closes the open end of the housing. The housing can be arranged in use so that its open end is an upper end. The housing can be arranged in use so that its open end is a lower end.

When the housing is open at one end to allow the filter element to be positioned within the housing, connections between the filter element and ports for the process fluid can be made at the end of the housing which is opposite to the open end.

The inner wall of the cavity can be provided by an additional filter element.

The material from which a housing is made will be selected according to the conditions and materials to which the filter will be exposed when in use. It can be preferred to make the housing from a polymeric material for some applications. Use of a polymeric material can have the advantage of light weight and ease of manufacture by a moulding process. Examples of suitable polymeric materials include polyolefins, polyamides, polyesters. A polymeric material which is used to make the housing can be reinforced with fibres. It can be preferred to make the housing from a metal. Use of a metal can have the advantage that the housing is resistant to damage, for example due to impact. Examples of metals which can be used to make the housing include steels, and aluminum and its alloys. When the first part of the end fitting is a cap, it can be made from the same material as the housing.

BRIEF DESCRIPTION OF THE DRAWINGS

Filter elements, filter assemblies and components thereof are described below by way of example with reference to the accompanying drawings, in which.

DETAILED DESCRIPTION

Figure 1:
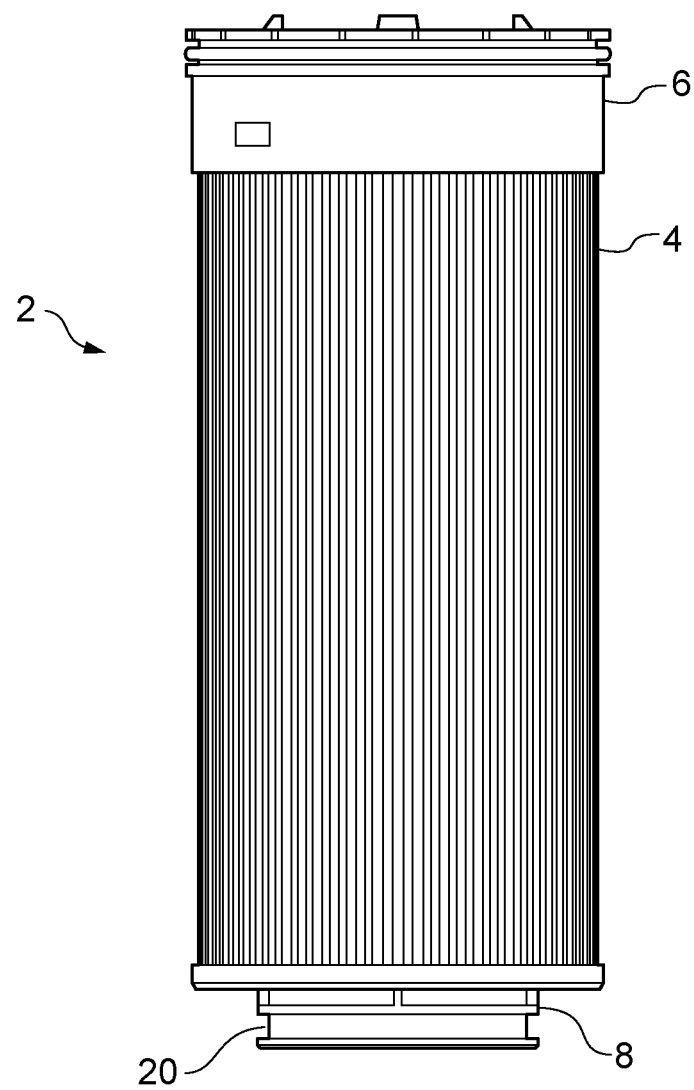
FIG. 1 is a side elevation of a filter element.
Figure 2:
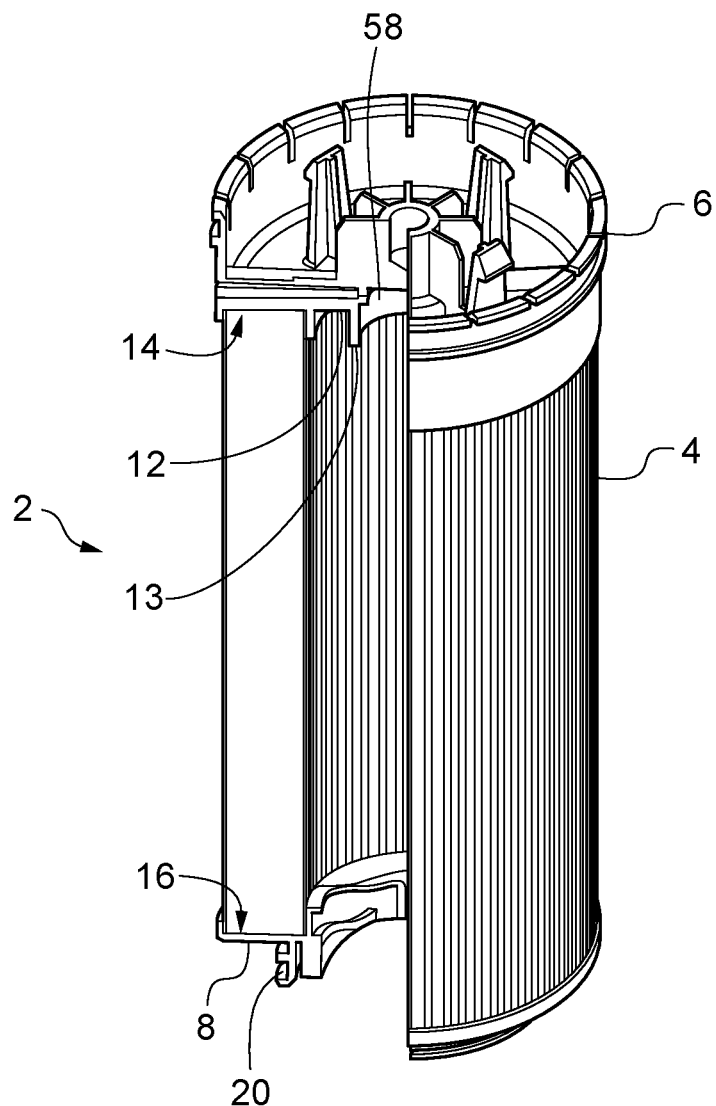
FIG. 2 is an isometric cut-away view of the filter element shown in FIG. 1, showing the end fittings and an outer cylindrical wall of a pleated filter media material.

Referring to the drawings, FIGS. 1 and 2 show a filter element 2 which can be used to filter a fluid so as to remove contaminants from the fluid. The element can be used to remove contaminants from a liquid. The contaminants can be in the form of solid particles. The contaminants can be in the form of droplets of an immiscible liquid. The fluid might be a fuel, such as a liquid hydrocarbon, and the filter can then be used in the removal of aqueous contaminants.

The filter element 2 has a cylindrical wall 4 which is formed from a paper filter media by pleating. The filter element has a top end fitting 6 and a bottom end fitting 8. Each of the end fittings has an outer groove formed in it in which an end face 10 of the cylindrical wall 4 is received. The outer groove 14 in the top end fitting faces downwardly, towards the bottom end fitting. The outer groove 16 in the bottom end fitting faces upwardly, towards the top end fitting.

The top end fitting has a downwardly facing inner groove 12 located radially inside the outer groove 10. The inner groove is defined inwardly by a shallow cylindrical wall 13 which defines a central core socket 58. The inner groove can receive an inner layer of a filter media material or a support core or both. For example, the filter element can include a layer of a coalescer material such as a coalescer foam. The filter element can include a support core, for example provided by a perforated cylinder formed from metal sheet or by a porous support which is formed from a polymeric material, for example by moulding. Such additional components of the element are not shown in FIGS. 1 and 2.

The bottom end fitting 8 has an outwardly facing groove 20 which can receive a compressible O-ring seal. An O-ring in the groove of the external wall of the bottom end fitting 8 forms a seal with an internally facing portion of the outer cylindrical wall of a filter housing when the filter element is in its in-use position within the housing.

Figure 3:
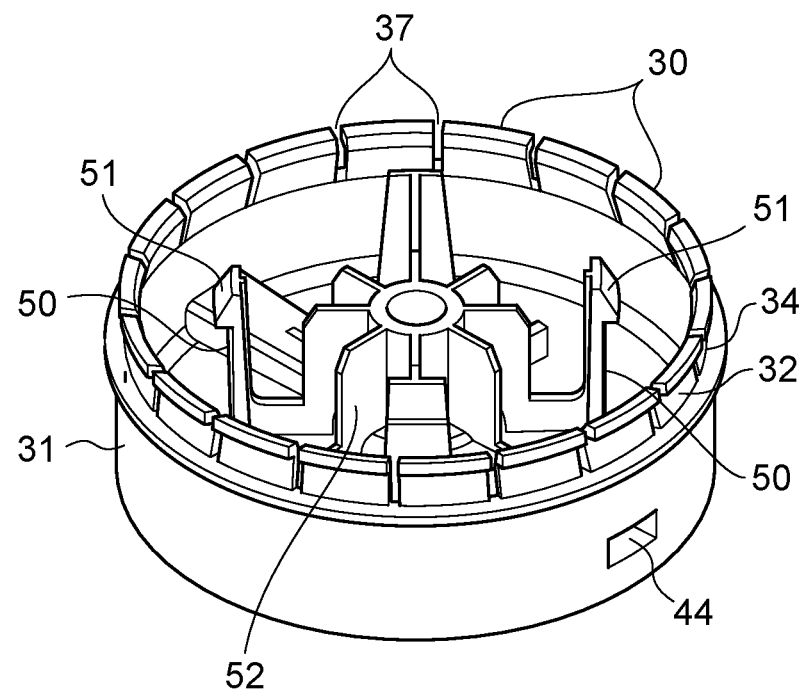
FIG. 3 is an isometric view of the top end fitting of the filter element shown in FIG. 1.
Figure 4:
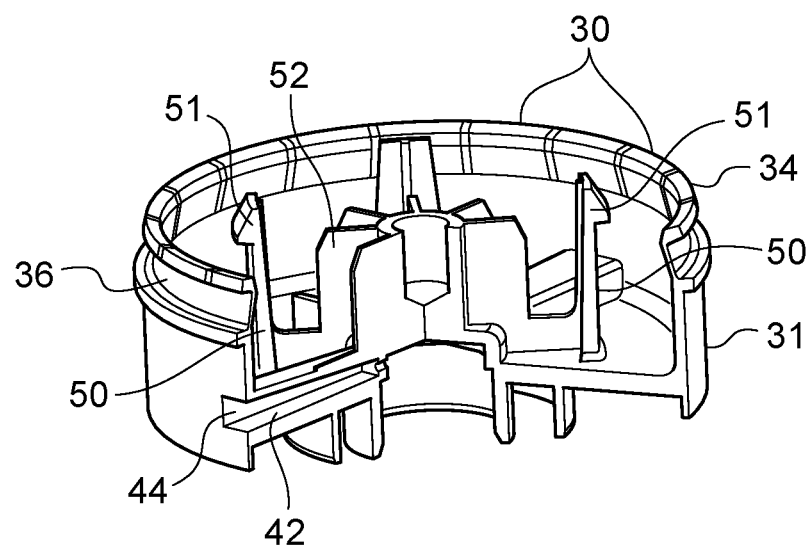
FIG. 4 is an isometric cut-away view of the top end fitting shown in FIG. 3, in which a sealing web in the form of a deformable collar has been applied to the base of an annular groove which extends around the end fitting.
Figure 5:
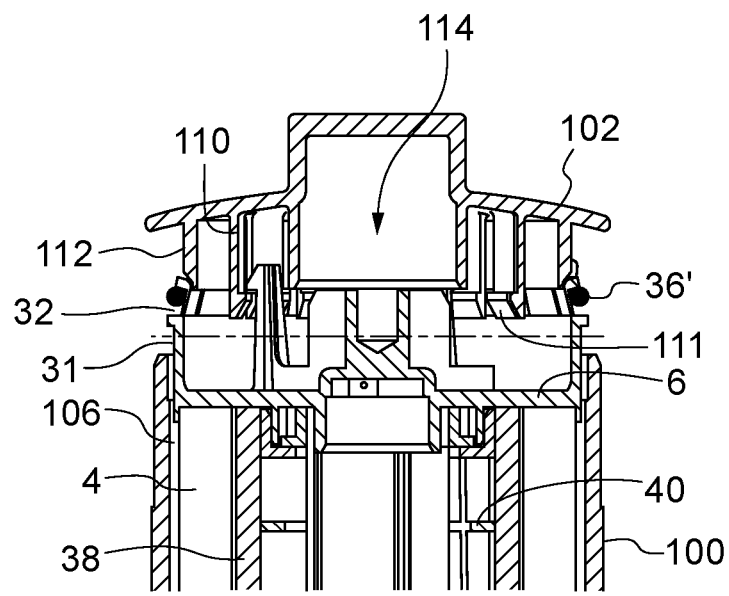
FIG. 5 is a sectional elevation through an upper portion of a filter assembly which includes a filter element as shown in FIG. 1, with an expander component in the form of a closing lid for the housing in position to be pressed on to the end fitting to cause the end fitting to expand.
Figure 6:
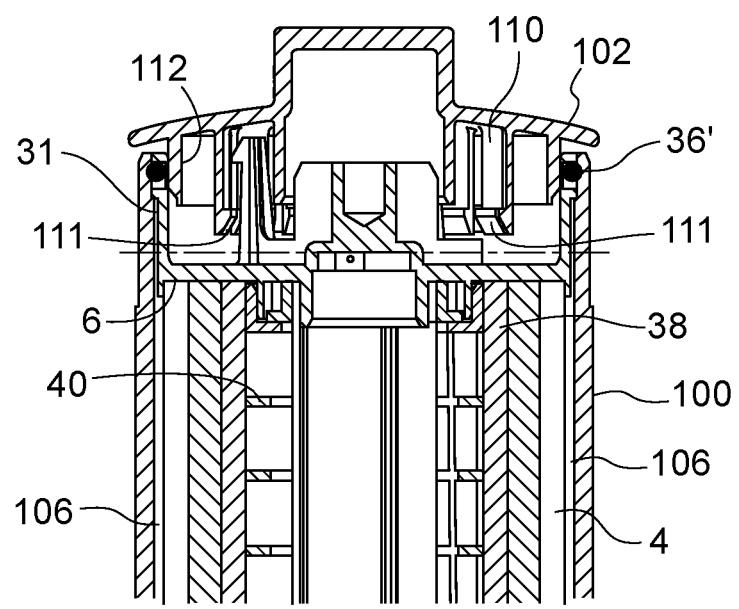
FIG. 6 is a sectional elevation through the upper portion of the filter assembly as shown in FIG. 5, with the closing lid for the housing pressed on to the end fitting, to cause the end fitting to expand.

The top end fitting 6 is shown in greater detail in FIGS. 3 and 4. The fitting has a plurality of castellations 30 formed in its side wall 31. The top edge of each of the castellations is chamfered on its inwardly facing surface (as can be seen in FIGS. 5 and 6). A radially outwardly facing groove 32 is defined by the castellations between a rib 34 at the top edges of the castellations and the remainder of the wall extending from the castellations towards the bottom edge of the top end fitting. The base surface of the groove 32 is inclined inwardly towards the top edges of the castellations when the top end fitting is in its undeformed configuration, as shown in FIG. 3. The portion of the side wall of the top end fitting between the castellations 30 and the bottom edge of the fitting is approximately cylindrical.

FIGS. 3 and 4 show a sealing ring 36 which extends around the top end fitting in the groove 32. The sealing ring is formed by moulding. For example, the sealing ring can be formed by moulding in situ within the groove 32 in the top end fitting. The sealing ring within the groove has a generally flat cross-section. The material of the sealing ring also fills the gaps 37 between adjacent castellations, preferably so that it is bonded to the sides of the castellations where they face towards one another. The material of the sealing ring is capable of elastic deformation. Use of a deformable material for the sealing ring means that the sealing ring material can remain bonded to the sides of the castellations when the sides move apart slightly due to flexing of the castellations, for example when the castellations are deformed outwardly by being bent about their bottom edges.

The end fittings 6, 8 of the filter element 2 can be formed from a polymeric material by moulding. Suitable polymeric materials include polyolefins, polyamides, polyesters, polycarbonates and the like. A polymeric material from which an end fitting is formed by moulding can include a reinforcing component, for example reinforcing fibres.

The top end fitting 8 has three extending upwardly tangs 50. Each of the tangs has an outwardly facing barb 51. The tangs are capable of flexing radially.

The top end fitting 32 has eight ribs 52 which extend radially outwardly from the centre of the top face of the end fitting. Each of the ribs has a tall portion close to the axis of the end fitting. The tall portions of the ribs effectively define a central turret having eight sides.

The top end fitting 32 has a pair of channels 42 which extend radially from openings 44 in the side wall of the end fitting, communicating at their inner ends with the central core socket 58 defined by the shallow cylindrical wall 13.

FIGS. 5 and 6 show an upper portion of a filter assembly which includes a filter element generally as discussed above with reference to FIGS. 1 to 4. The filter assembly includes a housing which is provided by a hollow cylindrical housing body 100 and a housing lid 102. The housing is configured so that the filter element can be fitted within the cylindrical space defined by the housing body and the housing lid. The housing has a base which includes an inlet port and an outlet port for the fluid which is filtered within the filter assembly. The housing base provides a cylindrical socket in which the bottom end fitting of the filter element can be received, in such a way that an O-ring located in the groove 20 in the bottom end fitting 8 of the filter element is compressed against the cylindrical surface provided by the socket when the filter element is in its in-use position within the housing.

The housing base includes a drain through which collected contaminants (especially liquid contaminants) can be removed from the filter assembly. Features of the housing base are not shown in the drawings. They are commonplace in known filter assemblies as used to filter fluids such as gases (for example compressed air) and liquids (for example to remove oil contaminants from water and to remove water contaminants from liquid hydrocarbons).

In the filter assembly which is shown in FIGS. 5 and 6, the filter element 2 has a sealing ring located in the groove 32 in the top end fitting 6 which is in the form of an O-ring 36' with a circular cross-section. The filter element is shown with a layer 38 of a coalescing foam located in the downwardly facing inner groove 12 of the top end fitting, together with a foraminous support element 40. A support component can be made from a polymeric material such as a polyolefin or a polyester or a polyamide. A support component can be made conveniently by moulding.

The housing lid 102 is circular with a radius which is sufficient for it to cover the upper edge of the cylindrical housing body 100. The housing lid has three downwardly extending tangs 110. Each of the tangs has an inwardly facing barb 111. The tangs are capable of flexing radially. The spacing between the tangs on the housing lid matches that of the tangs on the upper end cap so that the barbs on the housing lid and the end cap can engage one another.

The housing lid has a downwardly extending actuator flange 112. The bottom edge of the actuator flange is chamfered on its outwardly facing surface (as can be seen in FIGS. 5 and 6). The radius of the outside surface of the actuator flange 112 on the housing lid is approximately equal to the radius of the internal surface of the cylindrical portion of the side wall 31 of the upper end fitting which extends downwardly from the castellations 30.

The housing lid has a central cavity 114 whose cross-section is approximately octagonal. The cavity in the housing lid can receive the turret which is defined by the tall portions of the ribs 52 on the top end fitting when the lid is fitted on to the top end fitting.

Assembling the Filter Element in the Housing

An initial step in the assembly of the filter involves locating the filter element 2 in the housing body 100. This involves the bottom end fitting 8 being received within the cylindrical socket in the housing base so that an O-ring located in the groove in the bottom end fitting 8 of the filter element is compressed against the cylindrical wall that is provided by the socket. FIG. 5 shows the filter element when it is partially inserted into the housing and FIG. 6 shows the filter element fully inserted into the housing.

When the filter element 2 is fully inserted into the housing body 100, with the bottom end fitting 8 fully received in the cylindrical socket, the top end fitting 6 is located largely within the housing body at its open end so that the groove 32 in the top end fitting, and the sealing O-ring 36' in the groove, are located below upper edge of the housing body 100. The filter element is shown in this position within the housing body in FIG. 6.

The castellations 30 in the side wall of the top end fitting 6 are inclined inwardly during the step of positioning the filter element in the housing body. The external diameter of the top end fitting as defined by the sealing ring 36' is less than the internal diameter of the opening into the space that is defined by the top edge of the cylindrical wall of the housing body.

The housing lid 102 is positioned on the top of the housing body. The barbed tangs 110 on the housing lid are aligned with the barbed tangs 50 on the top end fitting 6 of the filter element 2. The tangs 50, 110 deform to enable the barbs 111 on the lid tangs 110 to pass the barbs 51 on the end fitting 50 as the lid is pressed on to the housing body. This results in the tangs 110 on the lid becoming engaged with the tangs 50 on the end fitting. The ribs 52 on the top end fitting 6 are received in the central cavity 114 in the housing lid. The engagement between the edges of the ribs and the walls of the octagonal cavity help to locate the lid relative to the filter element rotationally.

Continued movement of the housing lid 102 towards the filter element 2 causes the downwardly extending actuator flange 112 on the lid to engage the chamfered top edge of the side wall of the top end fitting of the filter element, which is provided by the castellations 30. The outer diameter of the actuator flange on the housing lid is less than the internal diameter of the side wall of the top end fitting at its top edge. The movement of the housing lid causes the castellations which make up the side wall of the top end fitting to deform outwardly, by a bending deformation about the bottom edges of the castellations. The deformation of the castellations causes the distance between adjacent castellations to increase. The result of the deformation is that the external diameter of the upper end cap in the region of the castellations increases, so that the sealing ring 36' which is provided in the groove 32 in the external walls of the castellations comes into contact with the inner cylindrical wall of the housing body. An annular space 106 between the cylindrical wall 4 of the filter element 2 and the internal wall of the housing body 100 is sealed at the top end of the housing by means of the sealing ring 36'.

It is an advantage that the sealing ring has a reduced diameter when the filter element is introduced into the housing body because the sealing ring is not forced into sealing contact with the relevant counter-surface during the introduction. This can help to reduce the risk of damage to the sealing ring during the introduction. The separation of the introduction and the formation of a seal can also help to reduce the risk of a filter element not being introduced fully into a filter housing.

The deforming interaction between the housing lid and the side wall of the top end fitting of the filter element is facilitated by the chamfer on the top edge of the side wall. A chamfer might be provided on the actuator flange on the lid, in addition to or instead of the chamfer on the top edge of the side wall.

The housing lid can be fastened to the housing body once the lid and the inner filter element are fully seated. For example, the housing lid might be fastened to the housing body by bayonet features, for example in which a bayonet lug is provided on the housing lid which is received in a bayonet slot on the housing body. A separate component such as a fastener band might be used to fasten the housing lid to the housing body.

Use of the Filter Assembly

The assembled filter assembly with the filter element 20 within the housing 100 defines flow paths for the process fluid. A first flow path extends from a fuel inlet in the housing body to the annular space between the internal surface of the cylindrical wall of the housing body and the external surface of the cylindrical wall 4 of the filter element 2.

Fluid which is supplied to the annular space 106 between the internal surface of the cylindrical wall of the housing body and the filter element flows through the media layers 4, 38 of the filter element. The support element 40 supports the media layers against the pressure of the fluid flowing through it. Contaminants (for example particulate contaminants, and water based liquid contaminants when the process fluid is a hydrocarbon fuel) collect on the media.

Fluid which has flowed through the media layers 4, 38 of the filter element 2 flows into the cylindrical cavity within the filter element, defined at its upper end by the core socket 58 provided by the top end fitting 6. The filtered fluid within the cylindrical cavity in the filter element is discharged from the filter assembly through an outlet in the housing base.

Such flow path arrangements for fluid in a filter assembly are known from existing filter assemblies.

Gases (especially air) which are entrained in fluid flowing through the filter are separated initially from the fluid at the filter element 2. Such gases tend to collect in the annular space between the internal surface of outer cylindrical wall 120 of the housing body 100 and the external surface of the cylindrical wall 4 provided by the paper filter media material of the filter element, at the top of that space. Collected gases can flow through the channels 42 in the upper end cap 6 of the filter element 2 to the central core socket 58. Collected gases can be vented to atmosphere.

Separating the Filter Element from the Housing

The filter element requires replacement when accumulated contaminants cause the pressure drop across the element to increase beyond a pre-determined threshold. Such operating requirements apply conventionally to existing filters. In a filter assembly such as that shown in the drawings, the housing lid can be separated initially from the housing body, for example by detaching the rib and slot features of a bayonet connection or removing a separate fastening strap. The housing lid can then be lifted from the housing body and from the inner and outer filter elements. This involves the actuator flange 112 on the housing lid separating from the upper end cap of the filter element so that the outwardly deformed castellations 30 can relax inwardly, and so that the sealing ring 36' in the groove 32 in the external walls of the castellations can separate from the cylindrical wall of the housing body.

Continued separation of the housing lid from the housing body causes the barbed tangs 50 on the top end fitting 6 of the filter element 2 to engage the barbed tangs 110 on the housing lid 102 so that the filter element is withdrawn from within the housing. The filter element can then be separated from the housing lid and replaced. It is an advantage that the operator does not need to touch the filter element during the step of removing it from within the housing.

In a variation of the disclosed embodiment, the support may be continuous around the periphery of the filter element and made from a material which can be deformed to allow the support to expand outwardly.

The invention claimed is:

1. A filter element which comprises a filtration media and an end fitting through which a sealing connection is made between the filter element and a housing so that, when the sealing connection is made, the end fitting defines in part a flow path for fluid between the housing and the filter element, in which the end fitting includes:
    a) an annular seal made from a compressible material which extends around a periphery of the filter element, and
    b) a support for the annular seal which can be expanded outwardly to cause a transverse dimension of the annular seal to increase so that the annular seal is urged into contact with an inner wall of the housing when the filter element is located in the housing,
    in which the support has a periphery and a plurality of slits formed in the support which facilitate outward expansion of the support, the plurality of slits being arranged around the periphery of the support so that the support comprises a plurality of segments which can flex to allow the transverse dimension of the support to increase.

2. The filter element as claimed in claim 1, further including a sealing web which covers each slit of the plurality of slits to prevent flow of fluid through each slit of the plurality of slits.

3. The filter element as claimed in claim 2, in which the sealing web is formed as a part of the support.

4. The filter element as claimed in claim 2, in which the sealing web is provided as a deformable collar formed from an elastomeric material which covers each slit of the plurality of slits in the support.

5. The filter element as claimed in claim 4, in which the annular seal is an O-ring and in which the annular seal and the sealing web can be fitted on to and separated from the support as a single component.

6. The filter element as claimed in claim 1, in which the annular seal is an O-ring which is separate from the support.

7. The filter element as claimed in claim 6, in which the support defines a groove in an outer wall of the end fitting and in which the O-ring is received in the groove.

8. The filter element as claimed in claim 1, in which the annular seal is an O-ring which is formed as one piece with the support.

9. An assembly including the filter element as claimed in claim 1, in which the support has an opening, and an expander component which can be inserted into the opening to cause the support to expand outwardly.

10. The assembly as claimed in claim 9, in which the expander component closes the opening when the expander component is inserted into the opening.

11. The filter element as claimed in claim 1, in which: the support comprises a plurality of castellations formed in a side wall of the end fitting, the plurality of castellations defining a radially outwardly facing groove between a rib at top edges of the plurality of castellations and a remainder of the side wall extending from the plurality of castellations towards a bottom edge of the end fitting, a base surface of the radially outwardly facing groove being inclined inwardly towards the top edges of the plurality of castellations when the end fitting is in an undeformed configuration; and the annular seal is a sealing ring which extends around the end fitting in the radially outwardly facing groove.

12. A filter assembly which comprises a filter element and a housing, the housing having a cavity in which the filter element is received, the filter element includes a filtration media and an end fitting through which a sealing connection is made between the filter element and the housing so that, when the sealing connection is made, the end fitting defines in part a flow path for fluid between the housing and the filter element, in which the end fitting includes:
    a) an annular seal made from a compressible material which extends around a periphery of the filter element, and
    b) a support for the annular seal which can be expanded outwardly to cause a transverse dimension of the annular seal to increase so that the annular seal is urged into contact with an inner wall of the housing, in which the support has a plurality of slits formed in the support which facilitate outward expansion of the support, the plurality of slits being arranged around a periphery of the support so that the support comprises a plurality of segments which can flex to allow a transverse dimension of the support to increase, the inner wall of the housing is contacted by the annular seal when the transverse dimension of the annular seal has been increased.

13. The filter assembly as claimed in claim 12, in which the inner wall of the housing is provided by an additional filter element.

14. The filter element as in claim 1, wherein the annular seal is supported by the plurality of segments.

15. A filter element comprising a cylindrical filtration media and an end fitting at an end of the cylindrical filtration media through which a sealing connection is made, the end fitting defines in part a flow path for fluid between the housing and the filter element, the end fitting including:
   a) an annular support having at least one slit formed in the annular support which facilitates an outward expansion of the annular support, the at least one slit being arranged around the annular support to define at least one segment which can flex to allow a transverse dimension of the annular support to increase, the at least one segment defining a radially outwardly-facing groove around a periphery of the annular support, and
   b) an annular, compressible seal located within the radially outwardly-facing groove, wherein the annular support and the annular, compressible seal are configured such that the annular support can expand outwardly to cause a transverse dimension of the annular, compressible seal to increase so that the annular, compressible seal is urged into sealing contact with an inner wall of the housing when the filter element is located in the housing.

16. The filter element as claimed in claim 15, further including a sealing web covering each slit of the at least one slit to prevent flow of fluid through each slit of the at least one slit.

17. The filter element as claimed in claim 16, in which the sealing web is integral with the annular support.

18. The filter element as claimed in claim 16, in which the sealing web is a deformable, elastomeric collar covering each slit of the at least one slit in the annular support.

19. The filter element as claimed in claim 18, in which the annular, compressible seal is an O-ring and in which the annular, compressible seal and the sealing web can be fitted on to and separated from the annular support as a single component.

20. The filter element as claimed in claim 15, in which the annular, compressible seal is an O-ring.

21. The filter element as claimed in claim 15, in which: the annular support comprises a plurality of castellations formed in a side wall of the end fitting, the plurality of castellations defining the radially outwardly facing groove between a rib at top edges of the plurality of castellations and a remainder of the side wall extending from the plurality of castellations towards a bottom edge of the end fitting, a base surface of the radially outwardly-facing groove being inclined inwardly towards the top edges of the plurality of castellations when the end fitting is in an undeformed configuration; and the annular, compressible seal is a sealing ring which extends around the end fitting in the radially outwardly-facing groove.

22. The filter element as in claim 15, wherein the annular, compressible seal is supported by the at least one flexible segment.

23. The filter element as claimed in claim 15, wherein the annular support projects outwardly away from an end face of the fitting.

24. The filter element as claimed in claim 15, wherein the annular support includes a plurality of slits arranged around the periphery of the annular support, and which define a plurality of segments that can flex to allow the transverse dimension of the annular support to increase.

* * * * *